United States Patent
Yasufuku

(10) Patent No.: US 8,151,036 B2
(45) Date of Patent: Apr. 3, 2012

(54) MEMORY CONTROLLER, MEMORY SYSTEM, AND ACCESS CONTROL METHOD OF FLASH MEMORY

(75) Inventor: Kenta Yasufuku, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 510 days.

(21) Appl. No.: 12/392,276

(22) Filed: Feb. 25, 2009

(65) Prior Publication Data

US 2009/0216937 A1 Aug. 27, 2009

(30) Foreign Application Priority Data

Feb. 27, 2008 (JP) ................. 2008-046705

(51) Int. Cl.
*G06F 12/00* (2006.01)
*G06F 11/10* (2006.01)

(52) U.S. Cl. ......... 711/103; 711/E12.001; 711/E12.008; 714/6.24

(58) Field of Classification Search .................. 711/103, 711/E12.001, E12.008; 714/6.24
See application file for complete search history.

(56) References Cited

U.S. PATENT DOCUMENTS

| | | | |
|---|---|---|---|
| 7,574,554 B2 * | 8/2009 | Tanaka et al. | 711/103 |
| 2004/0030971 A1 | 2/2004 | Tanaka et al. | |
| 2008/0016430 A1 | 1/2008 | Yoshida | |
| 2009/0222616 A1 * | 9/2009 | Yano et al. | 711/103 |
| 2011/0185105 A1 * | 7/2011 | Yano et al. | 711/103 |

FOREIGN PATENT DOCUMENTS

| | | |
|---|---|---|
| JP | 2007-87388 | 4/2007 |
| JP | 2008-9943 | 1/2008 |

OTHER PUBLICATIONS

U.S. Appl. No. 12/566,236, filed Sep. 24, 2009, Yano, et al.

* cited by examiner

*Primary Examiner* — Matthew Bradley
*Assistant Examiner* — Mehdi Namazi
(74) *Attorney, Agent, or Firm* — Oblon, Spivak, McClelland, Maier & Neustadt, L.L.P.

(57) ABSTRACT

A memory controller adds dummy data to write data by referring to instruction information about a descriptor transfer of the write data if a size of the write data to be written according to a data-write request information does not match a page size unit, thereby adjusting the size of the write data to the page size unit and then outputs the write data.

19 Claims, 6 Drawing Sheets

| ENTRY 1 | DATA-TRANSFER SOURCE ADDRESS | DATA SIZE |
|---|---|---|
| ENTRY 2 | DATA-TRANSFER SOURCE ADDRESS | DATA SIZE |
| ENTRY 3 | DATA-TRANSFER SOURCE ADDRESS | DATA SIZE |
| ⋮ | ⋮ | ⋮ |

| ENTRY 1 | DATA-TRANSFER SOURCE ADDRESS | FLAG | DATA SIZE |
|---|---|---|---|
| ENTRY 2 | DATA-TRANSFER SOURCE ADDRESS | FLAG | DATA SIZE |
| ENTRY 3 | DATA-TRANSFER SOURCE ADDRESS | FLAG | DATA SIZE |
| ⋮ | ⋮ | ⋮ | ⋮ |

MEMORY CONTROLLER, MEMORY SYSTEM, AND ACCESS CONTROL METHOD OF FLASH MEMORY

CROSS-REFERENCE TO RELATED APPLICATIONS

This application is based upon and claims the benefit of priority from the prior Japanese Patent Application No. 2008-046705, filed on Feb. 27, 2008; the entire contents of which are incorporated herein by reference.

BACKGROUND OF THE INVENTION

1. Field of the Invention

The present invention relates to a memory controller, a memory system, and an access control method of a flash memory.

2. Description of the Related Art

Recently, non-volatile semiconductor memories are used in various devices ranging from large-scale computers to personal computers, home appliances, cellular phones or the like. A NAND flash memory in particular is a non-volatile, large capacity, and highly integrated semiconductor memory in which data can be rewritten electrically, and it is considered as an alternative to hard disk drives (HDDs).

JP-A 2007-87388 (KOKAI) discloses a data processing system that employs a NAND flash memory. In this data processing system, by control of a memory controller that controls a reading operation of a flash memory, data is transmitted from a flash memory having a buffer memory that temporarily stores page data to a dynamic random access memory (DRAM).

Typically, an error check and correction code (ECC) is added to data when writing the data in the NAND flash memory, and error check and correction is performed on the data by using the ECC in the data at the time of reading the data. The reliability of the NAND flash memory is increased by taking this approach.

At the time of writing write data into the NAND flash memory, because the write data is written after adding the ECC in the write data, when the write data is written in a situation where the data size of the write data is less than the page size of the NAND flash memory, there are cases that the data in the NAND flash memory cannot be read properly due to generation of an ECC error at the time of subsequent data reading. To take care of this issue, when the data size of the write data is less than the page size of the NAND flash memory, dummy data is added to the write data so that the total data size of the write data is equal to the page size of the NAND flash memory, and then the write data is written in the NAND flash memory. This procedure of writing the write data is performed by a central processing unit (CPU) that prepares the dummy data on a random access memory (RAM), i.e., a buffer, according to a management program (FW: firmware) and adds the dummy data to the write data.

However, when the dummy data is prepared on a RAM on the side of the FW, there is a rise in the usage of the RAM capacity for saving the dummy data and also a rise in the usage rate of a bus by an amount of dummy data when writing the write data into the NAND flash memory from the RAM, which makes it impossible for another master to access the RAM. There is another problem such that when the write data and the dummy data are prepared in a DRAM outside of a chip having a memory controller, the rate of accessing outside of an application specific integrated circuit (ASIC) chip is increased, which results in higher power consumption.

BRIEF SUMMARY OF THE INVENTION

One aspect of this invention is to provide a memory controller that controls access to a flash memory in which data is written in a page size unit according to data-write request information. the memory controller adds dummy data to write data by referring to instruction information about a descriptor transfer of the write data if a size of the write data to be written according to the data-write request information does not match the a page size unit, thereby adjusting the size of the write data to the page size unit and then outputs the write data.

Another aspect of this invention is to provide a method of controlling access to a flash memory in which a memory controller controls access to a flash memory in which data is written in a page size unit according to data-write request information. The method includes the memory controller acquiring write data to be written into the flash memory according to the data-write request information; the memory controller adding dummy data to the write data by referring to instruction information about a descriptor transfer of the write data if a size of the write data to be written according to the data-write request information does not match the page size unit and adjusting the size of the write data to the page size unit; and the memory controller outputting the write data by referring the instruction information.

DETAILED DESCRIPTION OF THE INVENTION

Exemplary embodiments a memory controller, a memory system, and an access control method of a flash memory according to the present invention will be explained below in detail with reference to the accompanying drawings. The present invention is not limited to the embodiments. Moreover, the embodiments can be modified appropriately without departing from the scope of the invention.

Embodiments

Figure 1:
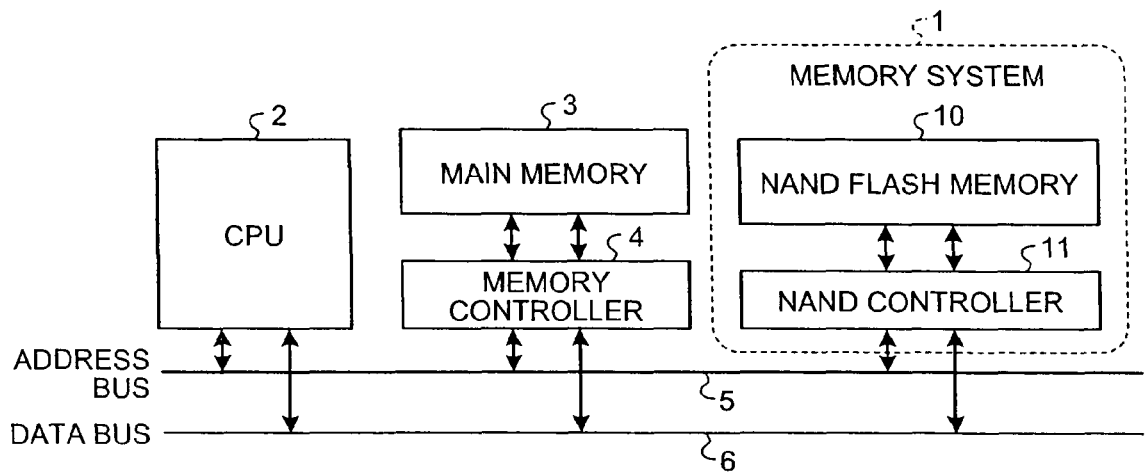
FIG. 1 is a schematic diagram of an example of a computing system including a memory system according to an embodiment of the present invention.

FIG. 1 is a schematic diagram of an example of a computing system including a memory system 1 according to an embodiment of the present invention. The memory system 1 is a memory device connected to a not shown host device (such as a personal computer (PC)).

The computing system includes a CPU 2, a main memory 3 such as a DRAM, a memory controller 4 that controls the main memory 3, and the memory system 1. The CPU 2, the main memory 3, and the memory system 1 are connected to each other via an address bus 5 that handles addresses and a data bus 6 that handles data.

In this computing system, in response to a transfer request (a read request or a write request) from the CPU 2, data in the CPU 2 (including data input from outside) or data in the main memory 3 is transferred to the memory system 1 when the transfer request is a write request, and data in the memory system 1 is transferred to either the CPU 2 or the main memory 3 when the transfer request is a read request.

The memory system 1 includes a NAND flash memory 10 that is a type of a non-volatile semiconductor memory and a NAND controller 11 that controls the NAND flash memory 10. A configuration example of the memory system 1 is described below.

Figure 2:
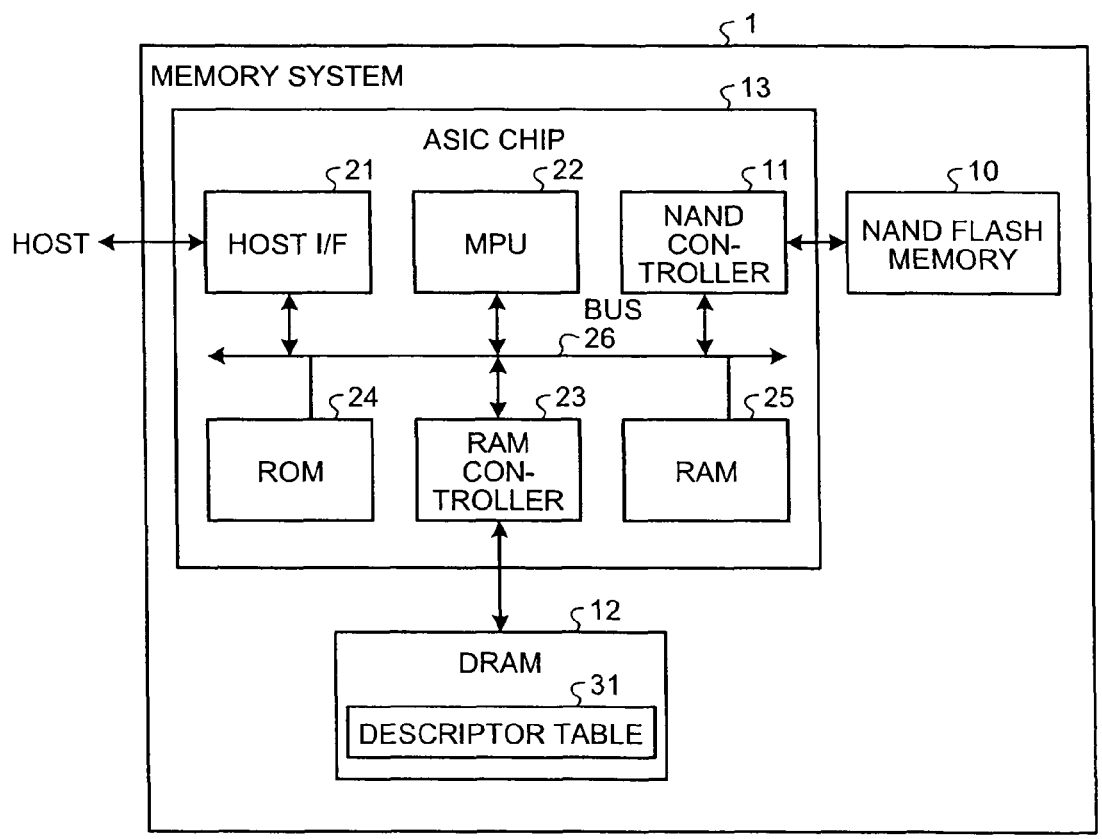
FIG. 2 is a schematic diagram of a configuration of the memory system.

FIG. 2 is a schematic diagram of the configuration of the memory system 1. The memory system 1 includes the NAND flash memory 10, a DRAM 12, and an ASIC chip 13. The NAND flash memory 10 includes a plurality of block regions, as data erase units, arranged in a matrix.

The DRAM 12 is arranged outside the ASIC chip 13, and it is used as a buffer for transferring data to and from the host device or writing and reading data to and from the NAND flash memory 10. The data to be written into the NAND flash memory 10 is present in the DRAM 12. The DRAM 12 stores therein a descriptor table 31 that contains transfer parameters that are instruction information about the descriptor transfer of the data to be written into a page size unit into the NAND flash memory 10. The NAND controller 11 refers to the descriptor table 31 when performing descriptor transfer.

The ASIC chip 13 includes a host interface (host I/F) 21, a micro processing unit (MPU) 22, the NAND controller 11, a RAM controller 23, a read only memory (ROM) 24, and a RAM 25. These units are connected to each other via a bus 26.

The host I/F 21 functions as an interface between the NAND controller 11 and the host device (the CPU 2 and the main memory 3 shown in FIG. 1) to transfer data to and from the host device.

The MPU 22 controls an operation of the entire memory system 1. When power is supplied to the memory system 1, for example, the MPU 22 reads a firmware (control program) from the ROM 24, writes the read firmware onto the RAM 25, and executes a predetermined process, thereby creating various tables on the RAM 25. The MPU 22 receives a write request, a read request, or an erase request from the host device, and executes a predetermined process on the NAND flash memory 10 based on the received requests. The MPU 22 can exchange data with the NAND flash memory 10 via the NAND controller 11.

Figures 3, 4, 5:
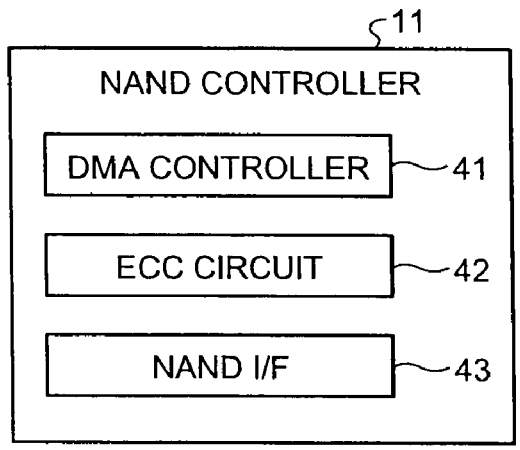
FIG. 3 is a configuration example of a NAND controller.
FIG. 4 is an example of the contents of a descriptor table stored in the memory system.
FIG. 5 is another example of the contents of the descriptor table.

FIG. 3 is a configuration example of the NAND controller 11. As shown in FIG. 3, the NAND controller 11 includes a direct memory access (DMA) controller 41 for DMA transfer control, an ECC circuit 42, and a NAND interface (I/F) 43. The DMA controller has a write-data transferring function and a read-data transferring function. The write-data transferring function includes transferring, together with the ECC, data that is read from the bus 26 and that is to be written into the NAND flash memory 10, to the NAND flash memory 10 in a page size unit. The read-data transferring function includes reading data in a page size unit and the ECC from the NAND flash memory 10 and outputting the read data to the bus 26.

The DMA controller 41 also has a fixed-value writing function of creating dummy data to compensate for insufficient data, adding the dummy data to write data so that the total size of the write data is equal to the page size unit, transferring the resultant write data to the NAND flash memory 10 thereby writing the write data in the NAND flash memory 10 in response to a write request from the host device. The fixed-value writing function is executed when the size of the write data does not match the page size of the NAND flash memory 10 (when the size of data to be written into the NAND flash memory 10 is less than the page size, for example). Because of this function, even if the data size of the write data does not match the page size of the NAND flash memory, it is still possible to prevent occurrence of an ECC error due to the insufficient page size, at the time of the subsequent data reading.

The ECC circuit 42 includes a writing function for adding the ECC to the write data to be written into the NAND flash memory 10 and a function for correcting errors in read data that is data read from the NAND flash memory 10 based on the read data and the ECC read from the NAND flash memory 10. Because it is likely that the data contained in the NAND flash memory 10 has errors, the NAND controller 11 adds the ECC to the write data at the time of writing the data, and the NAND controller 11 corrects the error in the read data based on the ECC at the time of reading the data.

To access the NAND flash memory 10, the NAND I/F 43 includes a function for performing an interface process between the NAND controller 11 and the NAND flash memory 10.

To access the DRAM 12, the RAM controller 23 performs an interface process between the NAND controller 11 and the DRAM 12. The ROM 24 stores therein a control program controlled by the MPU 22, for example. The RAM 25 is used as a work area of the MPU 22, and stores therein the control program loaded from the ROM 24 and stores various tables. An advanced high-performance bus (AHB) can be used as bus 26, for example.

The data transferred from the host device (including the data from the CPU 2 or the main memory 3, and the data input from outside) in the memory system 1 thus configured is temporarily saved in the DRAM 12, and then written into the NAND flash memory 10. A process performed at this time is described next.

First, upon receiving the write data and the write request information from the host device, the MPU 22 temporarily saves the data in the DRAM 12. The MPU 22 then determines whether to perform descriptor transfer of the write data in the DRAM 12 to the NAND flash memory 10. When it is determined that the descriptor transfer is not to be performed, the MPU 22 sends an instruction to that effect to the NAND controller 11 so that the data is transferred to the NAND flash memory 10 by using normal transfer setting parameters.

In the NAND controller 11, the DMA controller 41 reads the write data from the DRAM 12 via the RAM controller 23 in response to the instruction, adds an ECC to the write data, and transfers the ECC-added write data to the NAND flash memory 10 in a page size unit. The ECC-added write data is thus written into the NAND flash memory 10. At this time, an address where the data is present, a transfer size, the writing address of the NAND flash memory 10 are designated, and the designated size of data is transferred from the addresses.

When it is determined that the descriptor transfer is to be performed, the MPU 22 creates a descriptor table to be referred during the descriptor transfer, and writes the descriptor table into the DRAM 12. The MPU 22 refers the descriptor table, and sends descriptor-transfer instruction information regarding execution of the descriptor transfer, together with the writing address of the NAND flash memory 10, to the NAND controller 11. In the NAND controller 11, the DMA controller 41 accesses the DRAM 12 to read the data from the DRAM 12 based on the reading address information from the MPU 22.

Further, in the NAND controller 11, based on the descriptor-transfer instruction information from the MPU 22, the DMA controller 41 accesses the DRAM 12 to read the descriptor table 31 held in the DRAM 12, thereby acquiring a descriptor transfer parameter for instructing what size of data is to be transferred to which address and also what size of dummy data is to be created and added to what size of data. The DMA controller 41 transfers the write data read from the DRAM 12 to the NAND flash memory 10, according to the descriptor transfer parameter.

FIG. 4 is an example of the contents of the descriptor table 31. In the descriptor table 31, "data-transfer source address" and "data size" to be transferred are written for each entry 1, 2, 3 . . . . In the case of the system shown in FIG. 2, the data-transfer source address in the descriptor table indicates a transfer address of the bus, and the NAND controller 11 reads the write data from the regions, writes to the NAND flash memory 10.

At this time, when the data-transfer source address in the descriptor table 31 has a special value, such as when all are 0 or 1, the DMA controller 41 creates dummy data of a predetermined capacity based on the transferred "data size" designated by the descriptor table 31. That is, from the data size designated by the descriptor table 31, the DMA controller 41 calculates the size of the dummy data that is necessary for writing in the NAND flash memory 10 in a page size unit, thereby creating the dummy data. The DMA controller 41 adds the dummy data to the data read from the DRAM 12 to transfer it to the NAND flash memory 10, generates and adds the ECC also to the dummy data in the ECC circuit 42, and transfers the data to the NAND flash memory 10 in a page size unit, in which the data is written.

Accordingly, the write data is transferred in a page size unit, and written into the NAND flash memory 10. Because the dummy data is not prepared on the DRAM 12, no memory space is used in the DRAM 12 to save the dummy data. Moreover, the dummy data is added to the data in the DMA controller 41 so that there is no rise in the usage rate of the bus from the DRAM 12 to the NAND controller 11 resulting from the dummy data. Furthermore, even when the write data is prepared in the DRAM 12, which is outside the ASIC chip 13 including a memory controller, because the dummy data is not prepared in the DRAM 12, there is no increase in power consumption caused due to an increase in the rate of accessing outside the ASIC chip 13 for writing the dummy data into the DRAM 12.

FIG. 5 is another example of the contents of the descriptor table 31. This descriptor table is written with "data-transfer source address", "flag", and "data size" to be transferred. In the descriptor table, a flag is attached to the data-transfer source address, and when the flag has a specific value, similar to the descriptor table shown in FIG. 4, the dummy data of a predetermined capacity is created based on the transferred "data size" designated by the descriptor table.

As described above, according to the embodiment, when writing the data to the NAND flash memory 10, the dummy data for adjusting the size of the write data is created in the DMA controller 41, that is, the dummy data is not prepared on the DRAM 12. Thus, the following effects can be obtained. That is, there is no need to reserve memory space in the DRAM 12 for saving the dummy data, which enables an effective use of the DRAM 12. The increase in the usage rate of the bus from the DRAM 12 to the NAND controller 11, which results from the transfer of the dummy data, can be prevented. Thus, an effective use of the bus 26 can be achieved. Further, a low power consumption can be achieved by shortening a writing process time and reducing the amount of power consumption because the access time caused by transferring and writing the dummy data into the DRAM 12 outside the ASIC chip 13 can be reduced.

As described above, a DRAM that is arranged outside the ASIC chip is used as the buffer. However, a RAM such as an SRAM that is arranged in the ASIC chip can be used as a buffer. Further, as the non-volatile semiconductor memory, a memory system using a NAND flash memory is used. However, a secure digital card (SD card), a universal serial bus (USB) memory or the like can be also used as the memory system.

Figure 6:
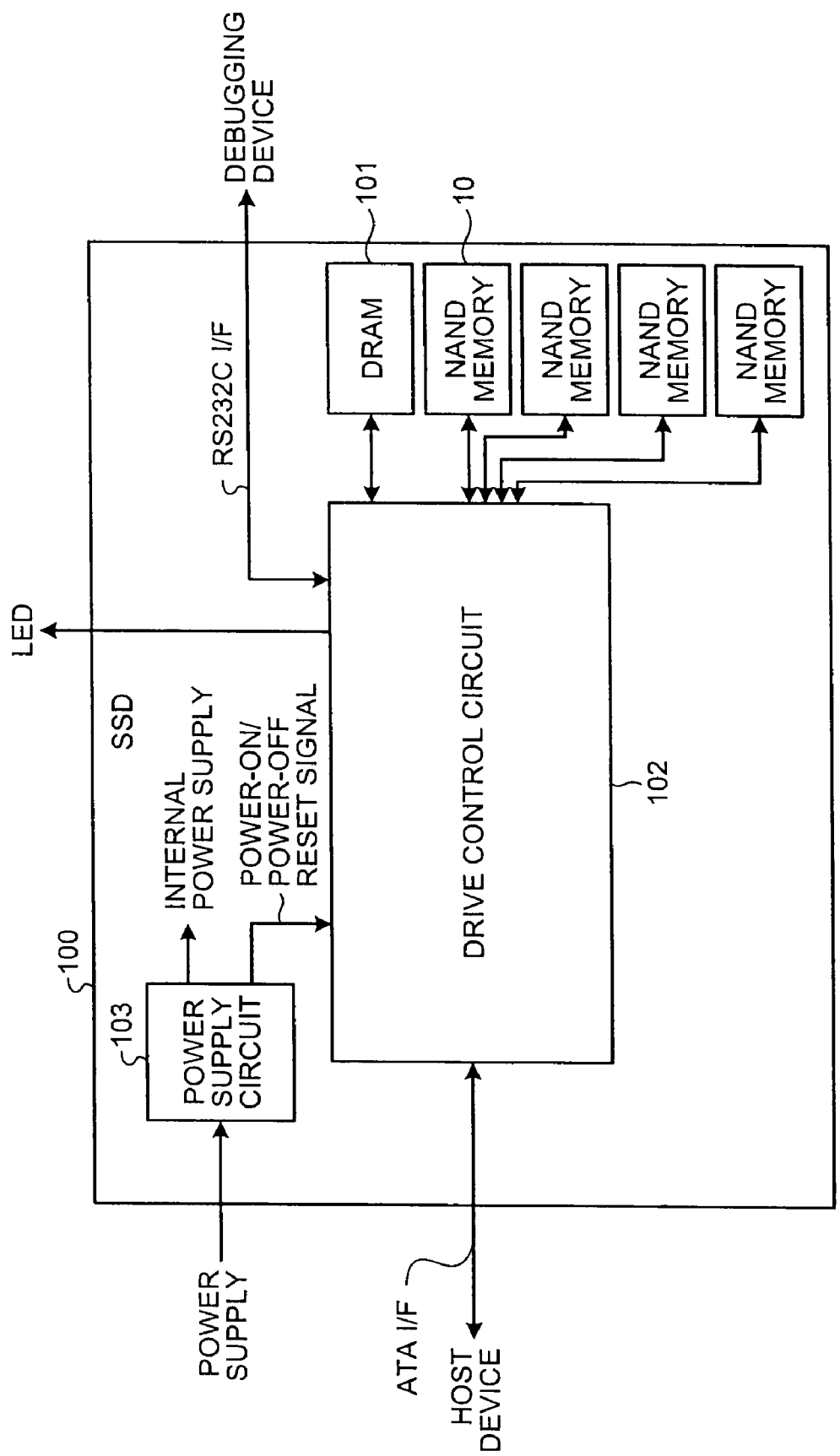
FIG. 6 is a block diagram of a configuration of an SSD according to the embodiment.

An example in which the memory system 1 according to the embodiment is configured as a solid state drive (SSD) is described below. FIG. 6 is a block diagram of a configuration of an SSD 100.

The SSD 100 includes a plurality of NAND flash memories (NAND memories) 10 for data storage, a DRAM 101 for data transfer or a work area, a drive control circuit 102 that controls these components, and a power supply circuit 103. The drive control circuit 102 outputs a control signal for controlling a light emitting diode (LED) for displaying a state, which is arranged outside the SSD 100.

The SSD 100 sends and receives data to and from the host device, such as a PC, via an ATA I/F. The SSD 100 also sends and receives data to and from a debugging device via an RS-232C I/F.

The power supply circuit 103 receives an external power supply and uses this external power supply to generate a plurality of internal power supplies. These internal power supplies are supplied to each component within the SSD 100. The power supply circuit 103 detects rising or falling of each external power supply, and generates a power-ON reset signal or a power-OFF reset signal. The power-ON reset signal and the power-OFF reset signal are forwarded to the drive control circuit 102.

Figure 7:
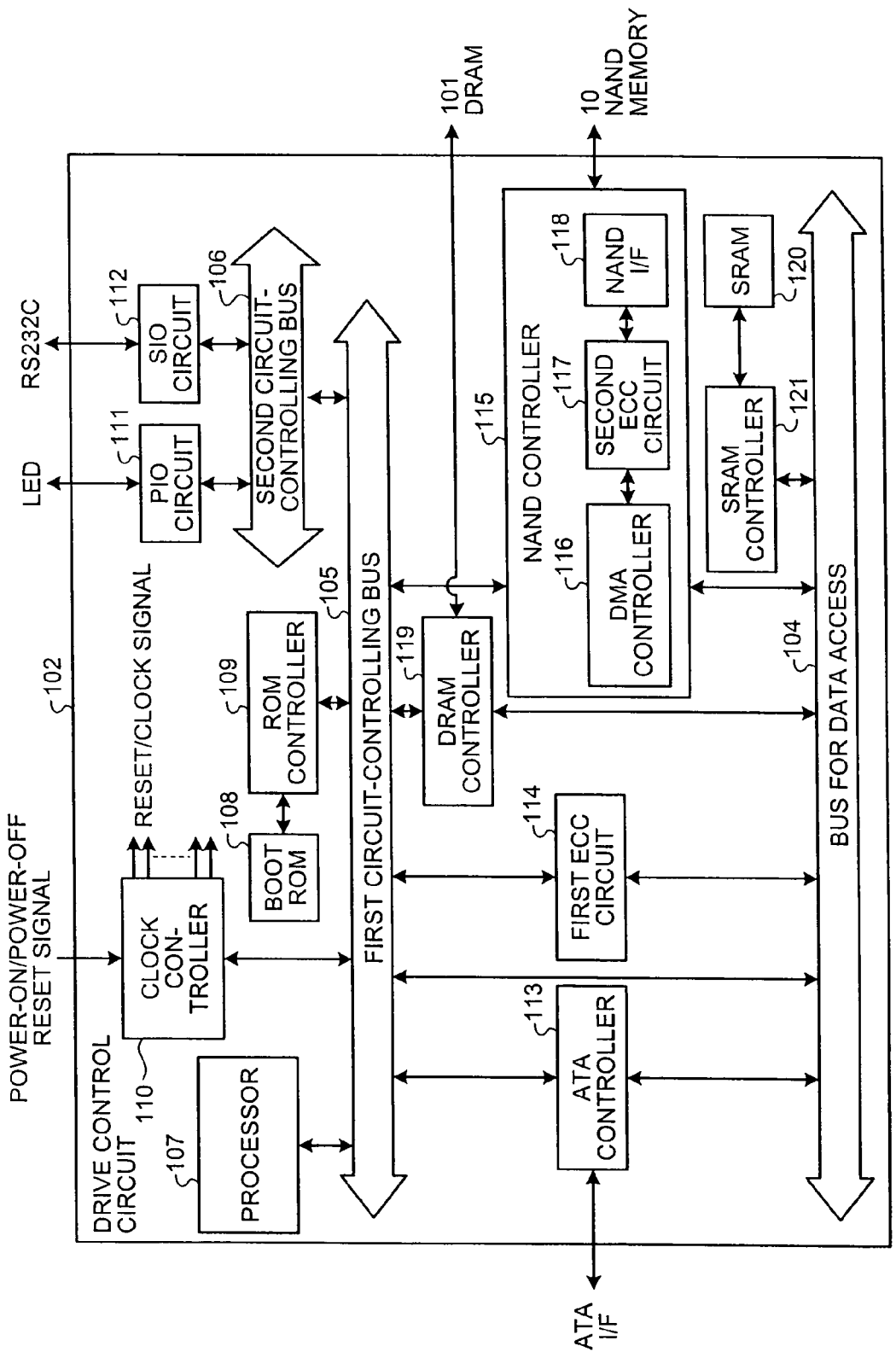
FIG. 7 is a block diagram of a configuration of a drive control circuit.

FIG. 7 is a block diagram of a configuration of the drive control circuit 102. The drive control circuit 102 includes a bus 104 for data access, a first circuit-controlling bus 105, and a second circuit-controlling bus 106.

The first circuit-controlling bus 105 is connected to a processor 107 that controls the entire drive control circuit 102. The first circuit-controlling bus 105 is also connected to a boot ROM 108 saved therein with a program for booting each management program (FW: firmware) via a ROM controller 109. The first circuit-controlling bus 105 is connected to a clock controller 110 that receives the power-ON/power-OFF reset signal from the power supply circuit 103 and supplies a reset signal and a clock signal to each part.

The second circuit-controlling bus 106 is connected to the first circuit-controlling bus 105. The second circuit-controlling bus 106 is connected to a parallel IO (PIO) circuit 111 that supplies a status displaying signal to the LED for displaying a state, and a serial IO (SIO) circuit 112 that controls the RS-232C I/F.

An ATA I/F controller (ATA controller) 113, a first ECC circuit 114, a NAND controller 115, and a DRAM controller 119 are connected to both the bus 104 for data access and the first circuit-controlling bus 105. The ATA controller 113 sends and receives data to and from the host device via the ATA I/F. The bus 104 for data access is connected to an SRAM 120, used as a data work area, via an SRAM controller 121.

The NAND controller 115 includes a NAND I/F 118 that performs an interface process with four NAND memories 10, a second ECC circuit 117, and a DMA controller 116 for DMA transfer control that is used to perform access control between the NAND memory and the DRAM.

Figure 8:
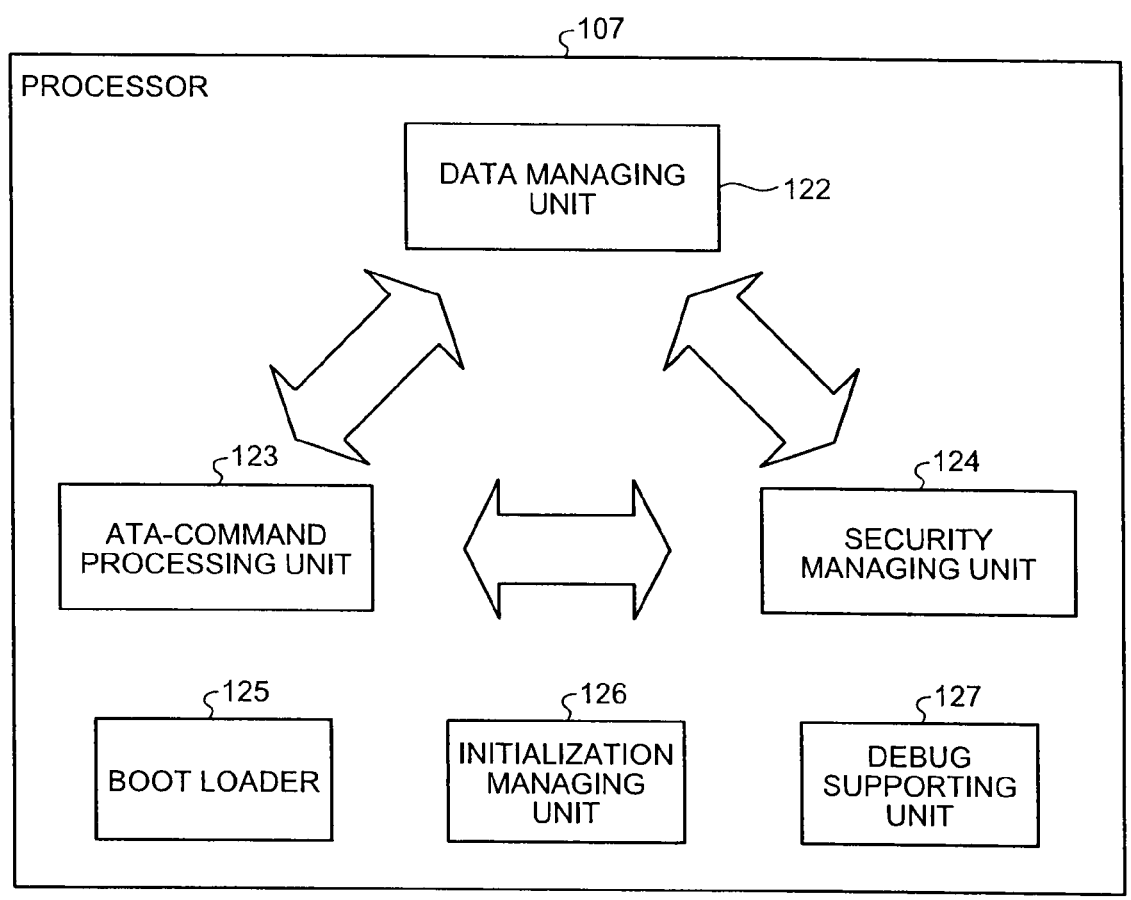
FIG. 8 is a block diagram of a configuration of a processor.

FIG. 8 is a block diagram of a configuration of the processor 107. The processor 107 includes a data managing unit 122, an ATA-command processing unit 123, a security managing unit 124, a boot loader 125, an initialization managing unit 126, and a debug supporting unit 127.

The data managing unit 122 controls a data transfer between the NAND memory and the DRAM and various functions related to a NAND chip via the NAND controller 115 and the first ECC circuit 114.

The ATA-command processing unit 123 performs the data transfer process in association with the data managing unit 122, via the ATA controller 113 and the DRAM controller 119. The security managing unit 124 manages various types of security information in association with the data managing unit 122 and the ATA-command processing unit 123. The boot loader 125 loads each management program (FW) from the NAND memory 10 to the SRAM 120, when the power is ON.

The initialization managing unit 126 initializes each controller/circuit in the drive control circuit 102. The debug supporting unit 127 processes debugging data supplied from outside via the RS-232C I/F.

Figure 9:
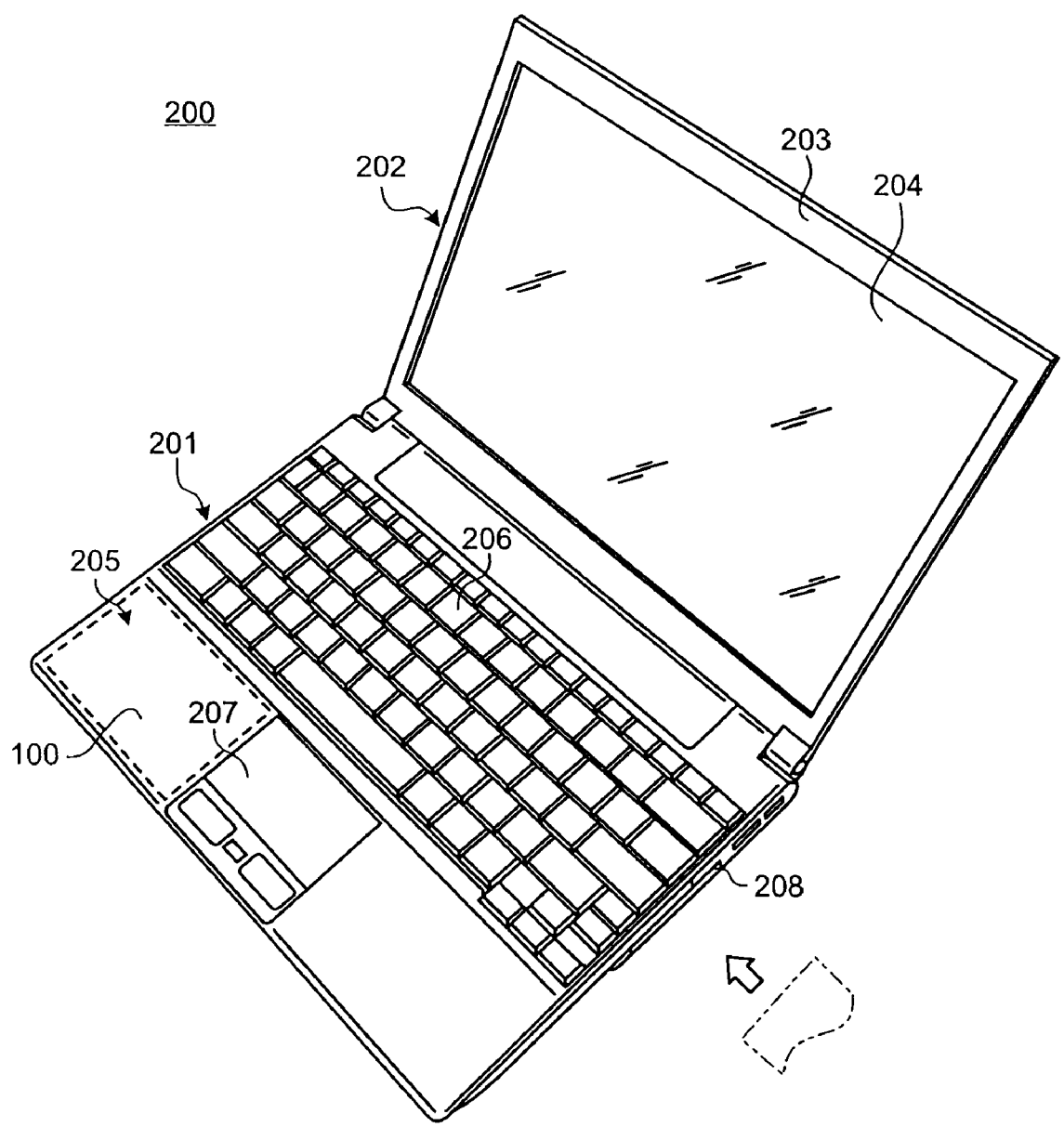
FIG. 9 is a perspective view of an example of a portable computer capable of incorporating the SSD.

FIG. 9 is a perspective view of an example of a portable computer 200 capable of incorporating the SSD 100. The portable computer 200 includes a main body 201 and a display unit 202. The display unit 202 includes a display housing 203 and a display device 204 accommodated in the display housing 203.

The main body 201 includes a casing 205, a keyboard 206, and a touch pad 207 or pointing device. A main circuit substrate, an optical disk device (ODD) unit, a card slot, the SSD 100 or the like are accommodated inside the casing 205.

The card slot is arranged adjacently to a peripheral wall of the casing 205. On the peripheral wall, an opening 208 facing the card slot is arranged. A user can insert and extract an additional device in the card slot from outside the casing 205 through the opening 208.

The SSD 100 can be used as an alternative to the conventional HDD in a state of being incorporated in the portable computer 200, or can be used as an additional device in a state of being inserted in the card slot provided in the portable computer 200.

The memory system 1 is not limited to an SSD, and can also be configured as a memory card, which is represented by an SDTM card, for example. When the memory system 1 according to the embodiment is configured as a memory card, its use is not limited to portable computers, and it can also be applied to various electronic appliances such as cellular phones, personal digital assistants (PDAs), digital still cameras, and digital video cameras.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory controller that controls access to a flash memory in which data is written in a page size unit according to data-write request information, wherein the memory controller adds dummy data to write data by referring to instruction information about a descriptor transfer of the write data if a size of the write data to be written according to the data-write request information does not match the page size unit, thereby adjusting the size of the write data to the page size unit and then outputs the write data.

2. The memory controller according to claim 1, wherein the memory controller adds the dummy data to the write data of which a specific address is designated as a data transfer source in the instruction information to adjust the size of the write data to the page size unit.

3. The memory controller according to claim 1, wherein the memory controller adds the dummy data to the write data to which a specific flag is added in the instruction information to adjust the size of the write data to the page size unit.

4. The memory controller according to claim 1, wherein the flash memory is a NAND flash memory.

5. The memory controller according to claim 1, wherein the memory controller includes a direct memory access (DMA) controller that controls a DMA transfer to the flash memory, and the DMA controller outputs the write data of which the size does not match the page size unit of the flash memory, among the entire write data to be written into the flash memory by adjusting the size of the write data to the page size unit.

6. The memory controller according to claim 1, wherein the memory controller includes an error correction code (ECC) circuit that generates an ECC to be added to the write data to be written into the flash memory and uses the ECC added to the write data to perform an error detection correction of data read from the flash memory.

7. The memory controller according to claim 6, wherein the ECC circuit generates the ECC to be added to the write data and the dummy data that are to be written into the flash memory.

8. A memory system comprising:
the memory controller according to claim 1;
the flash memory configured to store therein data and that is accessed by the memory controller to read the data; and
a memory configured to store therein the instruction information.

9. The memory system according to claim 8, wherein the memory controller adds the dummy data to the write data of which a specific address is designated as a data transfer source in the instruction information to adjust the size of the write data to the page size unit.

10. The memory system according to claim 8, wherein the memory controller adds the dummy data to the write data to which a specific flag is added in the instruction information to adjust the size of the write data to the page size unit.

11. The memory system according to claim 8, wherein the flash memory is a NAND flash memory.

12. The memory system according to claim 8, wherein the memory controller includes a direct memory access (DMA) controller that controls a DMA transfer to the flash memory, and the DMA controller outputs write data of which the size does not match the page size unit of the flash memory, among the entire write data to be written into the flash memory by adjusting the size of the write data to the page size unit.

13. The memory system according to claim 8, wherein the memory controller includes an error correction code (ECC) circuit that generates an ECC to be added to the write data to be written into the flash memory and uses the ECC added to the write data to perform an error detection correction of data read from the flash memory.

14. The memory system according to claim 13, wherein the ECC circuit generates the ECC to be added to the write data and the dummy data that are to be written into the flash memory.

15. The memory system according to claim 8, wherein the memory is a data-writing buffer into the flash memory, for the write data to be written into the flash memory.

16. The memory system according to claim 8, wherein the memory is a DRAM.

17. The memory system according to claim 8, further comprising:
- a micro processing unit that controls an operation of the memory system;
- an interface unit that performs an interface process of performing a data transfer to an external device; and
- a controller that performs an interface process between the memory controller and the memory and that is used by the memory controller to access the memory.

18. The memory system according to claim 17, wherein the micro processing unit, the interface unit, and the controller are mounted on an ASIC chip, and the memory is arranged outside the ASIC chip.

19. A method of controlling access to a flash memory in which a memory controller controls access to a flash memory in which data is written in a page size unit according to data-write request information, the method comprising:
- the memory controller acquiring write data to be written into the flash memory according to the data-write request information;
- the memory controller adding dummy data to the write data by referring to instruction information about a descriptor transfer of the write data if a size of the write data to be written according to the data-write request information does not match the page size unit and adjusting the size of the write data to the page size unit; and
- the memory controller outputting the write data by referring the instruction information.

* * * * *